J. C. GUERRANT.
FLUID-METERS.

No. 184,372. Patented Nov. 14, 1876.

Witnesses
Chas. H. Smith
Harold Serrell

Inventor
John C. Guerrant
per Lemuel W. Serrell
Atty

UNITED STATES PATENT OFFICE.

JOHN C. GUERRANT, OF DANVILLE, VIRGINIA, ASSIGNOR TO HIMSELF AND COLLETT LEVENTHORPE, OF RUTHERFORDTON, NORTH CAROLINA.

IMPROVEMENT IN FLUID-METERS.

Specification forming part of Letters Patent No. 184,372, dated November 14, 1876; application filed April 27, 1876.

*To all whom it may concern:*

Be it known that I, JOHN C. GUERRANT, of Danville, in the county of Pittsylvania and State of Virginia, have invented an Improvement in Fluid-Meters, of which the following is a specification:

This invention is made for regulating the speed of a revolving meter-wheel. I make use of a wheel that is revolved by the issuing water or fluid acting against inclined wings, and said wheel is moved to open the water-way more or less, according to the volume passing through the meter. I combine with the meter-wheel a resisting wing or wings, and a rotating sheath for the same; and I arrange the parts so that the wider the water-way is opened, the more the resisting wing or wings will be sheathed, so as to lessen the resistance in proportion to the volume passing through the meter, and allow of the meter-wheel revolving with increased rapidity, and the reverse, so that as the volume passing through the meter increases, the resistance to the revolution of the meter is lessened, and the speed thereof augmented, to effect the registration in proper proportion to the cubic feet or gallons passing through the meter.

Figure 1:
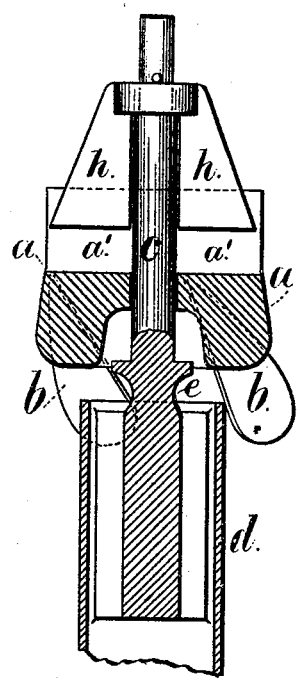
Figure 2:
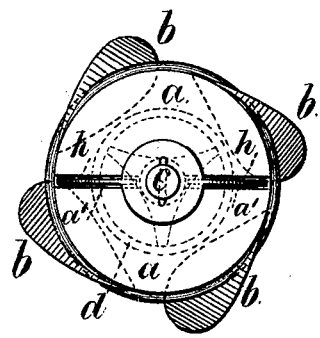

In the drawing, Figure 1 is a vertical section of the meter-wheel and supply-pipe, and Fig. 2 is a plan of the same.

The meter-wheel $a$ is provided with inclined wings or buckets $b$, against which the issuing water or fluid acts to revolve the said wheel. This meter-wheel is raised from its seat by the issuing fluid, and it may be of any desired construction. I have shown the same as upon a stem, $c$, at the end of the supply-pipe $d$, so as to be revolved by the issuing fluid, and there may be a deflector, $e$, that directs the water outwardly from the top of the supply-pipe $d$. There is a resisting wing or blade, $h$, that revolves with the wheel. Said resisting-wing may be of any desired shape, and of one or more blades or buckets. A case or sheath is provided for such resisting-wing, into which the wing is received more or less, according to the volume of water, so as to increase or lessen the resistance and regulate the speed of revolution accordingly. The sheath is represented as composed of the body $a$ of the wheel itself, there being a channel or case, $a'$, formed therein, so that the wheel, as it is lifted, will slide over and shield more or less of the resisting-wings, and in so doing effect said regulation. The sheath, however, may be applied in any convenient manner, and the sheath should be circular, so as not to offer a resistance to the revolution of the meter-wheel; but where the sheath is not circular, the area of resistance will be lessened by the wing sliding into it.

The resistance-wing may be placed above the revolving meter-wheel in the water that has passed through the supply-pipe. This resistance-wing may be upon the stem of the wheel, and such stem may slide endwise and the wing enter a case upon the arbor of the registering mechanism, and if the supply-pipe is made large enough and of a proper character, the resistance-wing and sheath may be placed in the supply-water and act in the manner before described.

The revolution of the meter-wheel gives motion to the train of registering-gearing in any convenient or known manner.

I claim as my invention—

The combination, with a revolving meter-wheel, of a resistance-wing and a sheath for the same, substantially as set forth, whereby the resistance-wing is sheathed more or less, according to the volume passing through the meter.

Signed by me this 20th day of April, A. D. 1876.

JOHN C. GUERRANT.

Witnesses:
    GEO. T. PINCKNEY,
    CHAS. H. SMITH.